United States Patent [19]

Slater

[11] Patent Number: 4,657,273

[45] Date of Patent: Apr. 14, 1987

[54] TWO-WHEELED CYCLE

[75] Inventor: Frank W. Slater, Durant, Okla.

[73] Assignee: Southeastern Research and Development, Inc., Durant, Okla.

[21] Appl. No.: 817,120

[22] Filed: Jan. 8, 1986

[51] Int. Cl.$^4$ .................. B62K 21/10; B62K 21/18
[52] U.S. Cl. .............................. 280/271; 280/255/258
[58] Field of Search .............. 280/263, 261, 270, 271, 280/253, 252, 238, 255, 256, 258

[56] References Cited

U.S. PATENT DOCUMENTS

| | | | |
|---|---|---|---|
| 384,134 | 6/1888 | Donkel | 280/253 |
| 418,963 | 1/1890 | Stoner | 280/258 |
| 502,232 | 7/1893 | Lind | 280/271 |
| 587,837 | 8/1897 | Latimer | 280/258 |
| 614,969 | 11/1898 | Murphy | 280/238 |
| 659,595 | 10/1900 | Schooler | 280/258 |
| 2,182,345 | 12/1939 | Mieher | 280/238 |
| 3,990,716 | 11/1976 | Dous | 280/271 |
| 4,198,072 | 4/1980 | Hopkins | 280/267 |
| 4,408,776 | 10/1983 | Randolph | 280/261 |

FOREIGN PATENT DOCUMENTS

| | | | |
|---|---|---|---|
| 2233218 | 1/1975 | France | 280/263 |
| 6355 | of 1886 | United Kingdom | 280/271 |

Primary Examiner—John J. Love
Assistant Examiner—Charles R. Watts
Attorney, Agent, or Firm—Harvey B. Jacobson

[57] ABSTRACT

A longitudinal frame is provided having upper front and rear end portions, a first stationary wheel supporting fork is dependingly supported from one of said portions and a second wheel supporting fork is oscillatably supported from the other frame portion for angular displacement about an outstanding axis. Rotatable mechanically operated power input structure is journaled from a lower intermediate length portion of the frame and drivingly connected to the wheel journaled from the first fork and the upper front and rear end portions of the frame have an oscillatable steering control and a stationary seat supported therefrom. The oscillatable steering control is operatively connected to the second wheel supporting fork and the rotatable power input structure includes a transverse horizontal shaft drivingly connected to the wheel of the first fork and having oscillatable pedal cranks operatively connected thereto through ratchet mechanisms.

4 Claims, 6 Drawing Figures

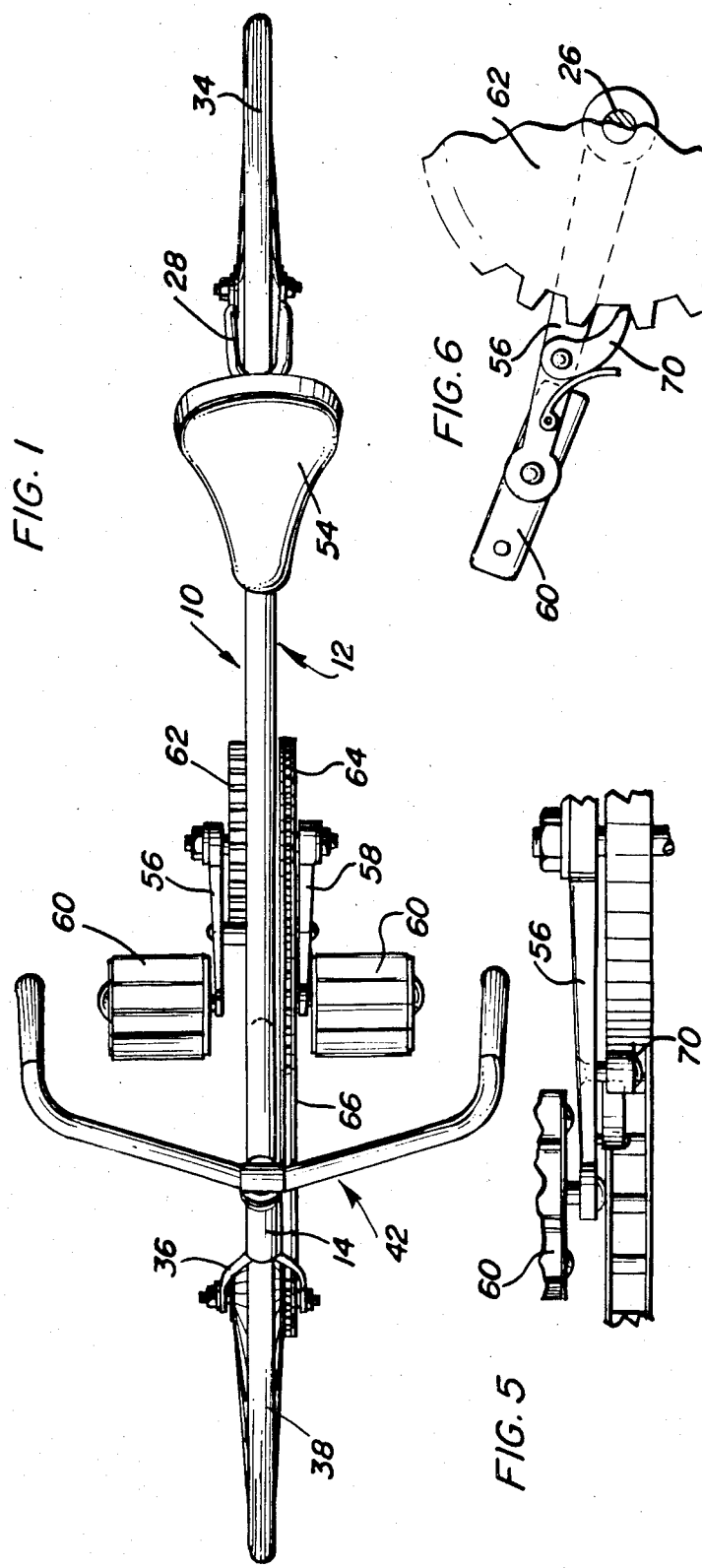
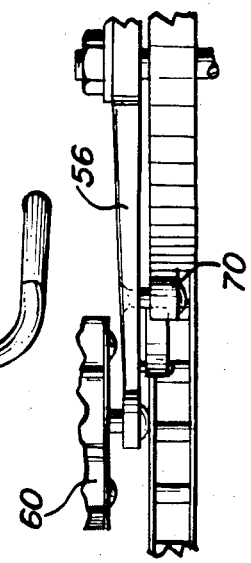
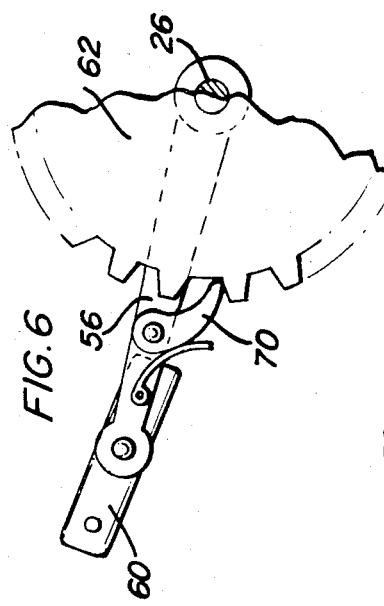
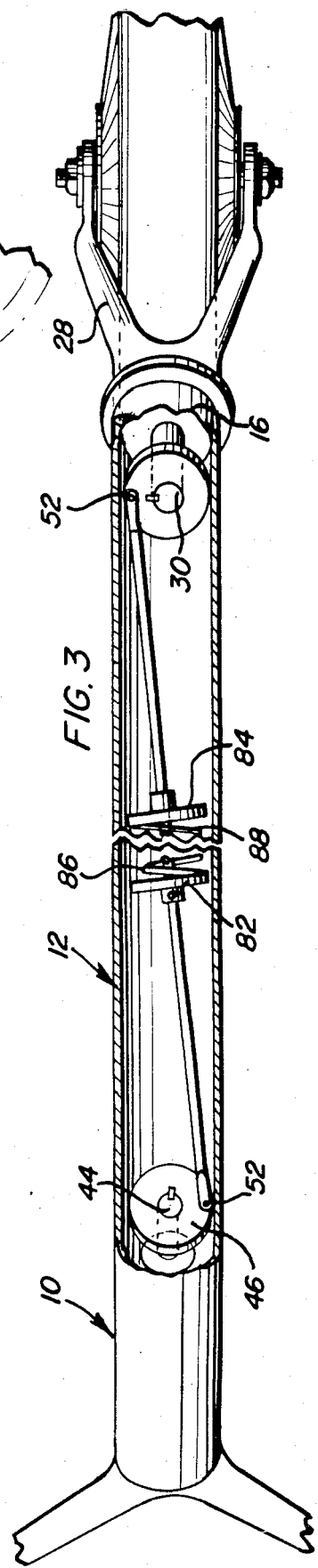

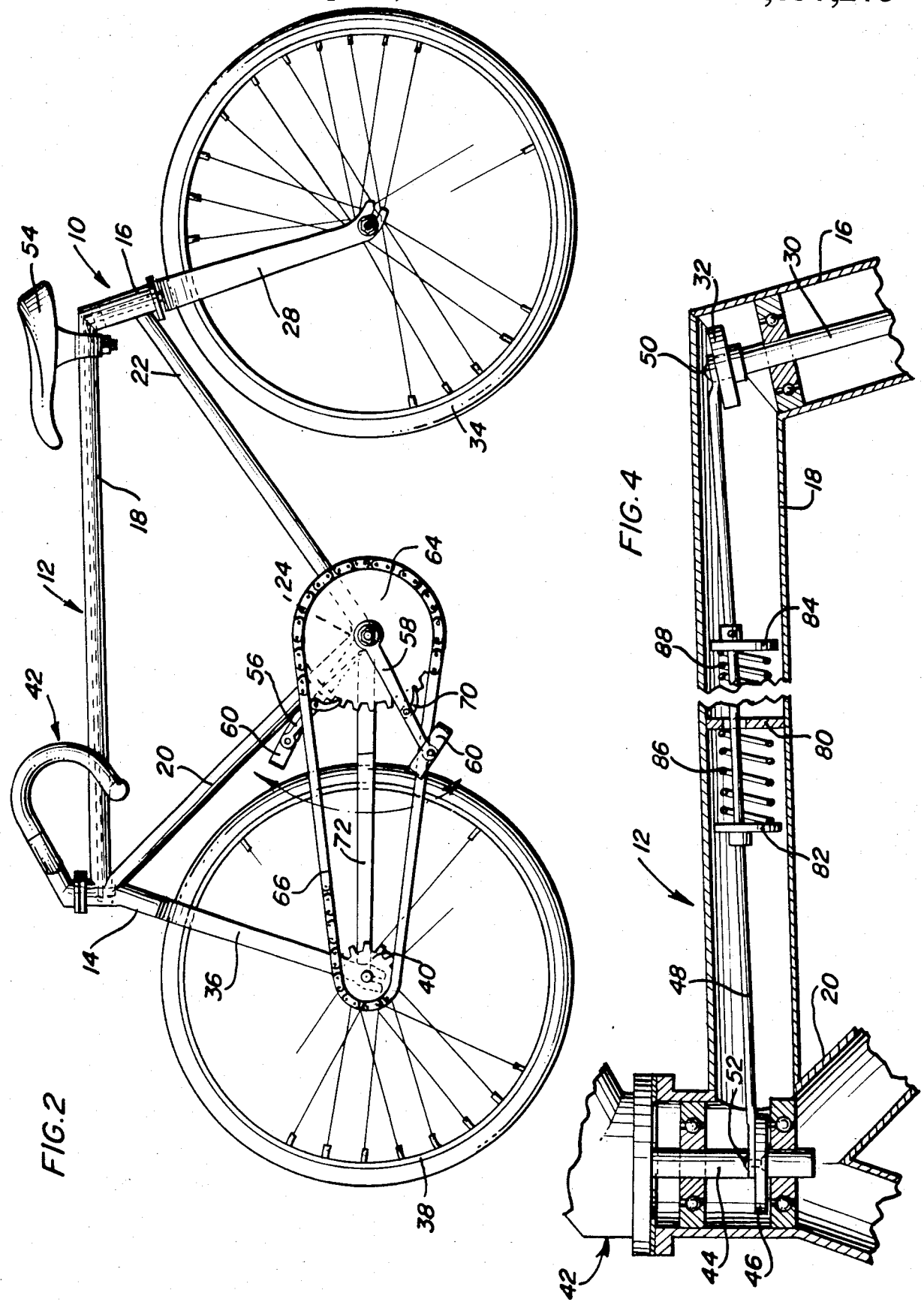

TWO-WHEELED CYCLE

BACKGROUND OF THE INVENTION

1. Field of the Invention

This invention relates to a pedal driven bicycle including a front drive wheel journaled for rotation about a stationary horizontal transverse axis and a rear steerable wheel, the usual pedals of the bicycle being mounted on crank arms independently oscillatably supported from a lower central portion of the bicycle frame and with each crank arm including a ratchet drive connection with ratchet wheel structure, drivingly connected to a sprocket wheel rotatable with the front drive wheel of the bicycle by a conventional link chain.

2. Description of Related Art

Various different forms of bicycles including front drive wheels and steerable rear wheels heretofore have been provided as well as other pedal propelled cycles including some of the general structural and operational features of the instant invention. Examples of various forms of these previously known form of cycles are disclosed in U.S. Pat. Nos. 384,134, 587,837, 2,182,345, 4,198,072 and 4,408,776.

However, these previously known forms of cycles do not include the overall structural and operational features of the instant invention which are believed coact in an efficient manner to provide a cycle of the pedal propelled, bicycle-type wherein a novel steering and drivable single occupant propelled vehicle is provided.

SUMMARY OF THE INVENTION

The bicycle of the instant invention includes a double independently oscillatable pedal equipped crank arm type of power input assembly to be driven by the legs of the rider of the bicycle and with the drive assembly including a sprocket wheel drivingly connected to the sprocket wheel on a stationary axis front wheel of the bicycle through a conventional link chain. The bicycle further includes a rear oscillatable rear wheel supporting fork and a forward oscillatable handlebar assembly connected to the rear oscillatable fork in a manner such that oscillation of the handlebar assembly will cause substantially similar oscillation of the oscillatable rear wheel supporting fork.

The main object of this invention is to provide a bicycle of novel construction and with steering and driving features thereof designed to require a higher degree of physical agility and balance by the rider of the bicycle.

Another object of this invention is to provide a pedal propelled bicycle-type vehicle including a double independently oscillatable pedal equipped crank drive assembly enabling more efficient utilization of the power of the legs of the rider of the bicycle to be converted to motive force for propelling the bicycle forwardly.

A final object of this invention to be specifically enumerated herein is to provide a new form of pedal propelled bicycle in accordance with the preceding objects and which will conform to conventional forms of manufacture, be of simple construction and require greater proficiency in bike riding, steering and propelling than that associated with a conventional form of bicycle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the bicycle of the instant invention;

FIG. 2 is a left side elevational view of the bicycle;

FIG. 3 is an enlarged fragmentary top plan view of the upper portion of the frame of the bicycle with portions thereof being broken away and illustrated in horizontal section;

FIG. 4 is a fragmentary vertical sectional view of the upper portion of the bicycle frame and with a central portion thereof being broken away;

FIG. 5 is a fragmentary top plan view illustrating the manner in which one of the pedal cranks is drivingly connected to the driving chain sprocket wheel of the bicycle through a ratchet mechanism; and FIG. 6 is a fragmentary side elevational view of the assemblage illustrated in FIG. 5.

DESCRIPTION OF THE PREFERRED EMBODIMENTS

Referring now more specifically to the drawings the numeral 10 generally designates the bicycle of the instant invention. The bicycle 10 includes a mainframe referred to in general by the reference numeral 12 and incorporating downwardly and outwardly inclined front and rear upper frame portions 14 and 16 which are tubular in construction and have their upper ends interconnected by an upper longitudinal tubular connecting member 18. In addition, a front rearwardly and downwardly inclined frame member 20 is secured at its upper forward end to the forward portion 14 and a forwardly and downwardly inclined rear frame member is connected at its upper rear end to the frame portion 16 and is inclined forwardly and downwardly therefrom. The lower rear and front ends of the frame members 20 and 22 are interconnected to a central lower journal portion 24 disposed therebetween and the journal portion 24 journals a shaft 26 therethrough disposed transverse to the frame 12.

A rearwardly and downwardly inclined fork 28 is oscillatably supported from the frame portion 16 and includes a shaft portion 30 projecting upwardly through the frame portion 16 and into the rear end of the connecting member 18. The upper end of the shaft portion 30 includes a lever disk or arm 32 supported therefrom. Further, the lower portion of the rear fork 28 journals a conventional bicycle wheel 34 therefrom.

The forward portion 14 includes a forwardly and downwardly inclined stationary fork 36 from whose lower portion a bicycle wheel 38 is journaled including a driven sprocket wheel 40.

A handlebar assembly referred to in general by the reference numeral 42 is journaled from the forward portion 14 for oscillation relative thereto about an upstanding axis and includes a lower shaft portion 44 oscillatable therewith within the frame portion 14. The shaft portion 44 also includes a lever disk or arm 46 and a connecting rod 48 extends through the connecting member 18 and has its rear end pivotally connected to the lever disk or armed 32 as at 50 and its forward end pivotally connected to the lever disk or armed 46 as at 52. Consequently, oscillation of the handlebar assembly is effective to impart similar oscillatory movement to the rear fork 28.

The rear end of the connecting member 18 supports a conventional forwardly facing saddle-type seat 54 and a pair of right and left crank arms 56 and 58 are removably oscillatably supported from opposite ends of the shaft 26 and include pedals 60 rotatably supported from their free ends. In addition, the opposite end portions of the shaft 26 immediately inwardly of the crank arms 56 and 58, have sprocket wheels 62 and 64, respectively, secured thereto for rotation therewith and sprocket wheel 64 is aligned with and drivingly connected to the sprocket wheel 40 by an endless link chain 66 trained about the sprocket wheels 64 and 40. Further, the crank arms of 56 and 58 are each provided with a spring biased oscillatable ratchet paw 70 intermediate their opposite ends enjoying a ratchet connection with corresponding sprocket wheel. Accordingly, upon oscillation of either crank arm 56 or 58 or both the crank arms 56 and 58 the sprocket wheel 64 may be driven in a direction to drive the front wheel 38 in a counterclockwise direction as viewed in FIG. 2.

A stationary movement limiting bail or frame (not shown) may be provided and stationarily supported from the mainframe 12 in order to limit oscillation of each of the crank arms 56 and 58 between the limit positions of oscillation thereof as represented by the crank arms 56 and 58. In this manner, interference between the ratchet paw 70 carried by the crank arm 58 and the chain 66 may be avoided. Also, the left hand end of the shaft 26 may be extended and the crank arm 58 may be shifted outwardly along the extended end of the shaft 26 and a second left hand (or third) sprocket wheel may be mounted on the shaft between the sprocket wheel 64 and the outwardly shifted crank arm 58. In this manner, each of the crank arms 56 and 58 may be fully orbited about the axis of rotation of the shaft 26 as well as oscillated relatively thereto. Of course, the pedals 60 may be provided with straps (not shown) or other means for releasably anchoring the shoes of the rider of the bicycle 10 to the pedal 60. If a third sprocket wheel is interposed between the sprocket wheel 64 and the outwardly shifted crank arm 58 is provided with the ratchet paw 70 of the crank arm operably engaged with the third sprocket wheel, the bicycle 10 may be propelled in the usual manner by full orbiting of the crank arms 56 and 58 about the axis of rotation of the shaft 26 or by independent oscillation of the crank arms 56 and 58 about the axis of rotation of the shaft 26. Further, in lieu of the illustrated ratchet connection at 62, 70 or the above-mentioned third sprocket wheel, the crank arms 56 and 58 may be journaled from and drivingly connected to the shaft 26 by one-way over running clutches, not shown.

The lower end of the front fork 36 is reinforced relative to the central lower journal portion 24 through the utilization of opposite side lower frame members 72 extending between opposite ends of the journal portion 24 and opposite side portion of the fork 36 on opposite sides of the wheel 38.

With attention now invited more specifically to FIG. 4, the central portion of the tubular connecting member 18 includes a stationary apertured partition 80 through which the connecting rod 48 extends and the connecting rod has a pair of abutments 82 and 84 mounted thereon on opposite sides of the partition 80 and a pair of compression springs 86 and 88 are disposed about the rod 48 intermediate the partition 80 and the abutments 82 and 84, respectively. The compression springs 88 are under compression and tend to yieldingly bias the connecting rod 48 to a central position of longitudinal displacement thereof, in which position the handlebar assembly 42 and rear fork 28 are disposed in centered positions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A bicycle including a longitudinal frame having upper front and rear frame portions, a depending front support stationarily mounted from said upper front frame portion and having a front driving support wheel journaled from the lower portion of said support, a depending rear support oscillatably supported from said upper rear frame portion for rotation about an upright rearwardly and downwardly inclined axis and having a support wheel journaled from the lower end of said rear support, a forwardly facing seat mounted from said upper rear frame portion, a steering control oscillatably supported from said upper front frame portion for angular displacement relative to said frame about an upstanding axis, said frame including an elongated tubular connected member extending between and interconnecting said upper front and rear frame portions, said steering control and rear support including lever arm means carried thereby for oscillation therewith, elongated connecting rod means pivotally anchored at its opposite ends to and extending between said lever arm means establishing a steering connection between said steering control and rear support for controlled oscillation of said rear support responsive to controlled oscillation of said steering control, said connecting rod means extending longitudinally through said connecting member, the longitudinal mid-portion of said connecting member including a stationary partition therein which includes an opening extending therethrough through which said connecting rod means is slidingly received, a pair of abutments stationary mounted on said connecting rod means in positions spaced on opposite sides of and opposing opposite sides of said partition, and coiled compression spring means disposed about said connecting rod means on opposite sides of said partition and between the latter and said abutments such that said spring means yieldingly biases said connecting rod means to a center position of longitudinal reciprocation in which said steering control and depending rear portion are disposed in centered positions.

2. The bicycle of claim 1 wherein said frame includes a lower central portion through which a transverse power input shaft in journalled and drivingly connecting said power input shaft to said front drive wheel.

3. The bicycle of claim 2 including pedal equipped crank means operatively connected to said power input shaft for driving the latter in response to oscillation of said pedal equipped crank means.

4. The bicycle of claim 3 wherein said pedal equipped crank means includes a pair of pedal equipped crank arms independently oscillatably mounted from opposite ends of said power input shaft on opposite sides of said lower central portion of said frame, ratchet wheel means mounted on opposite ends of said shaft for rotation therewith inwardly of said crank arms, said crank arms including ratchet pawl means operably engaged with said ratchet wheel means.

* * * * *